(12) United States Patent
Gillespie-Brown et al.

(10) Patent No.: US 9,267,641 B2
(45) Date of Patent: Feb. 23, 2016

(54) MULTIMEDIA DEVICE STAND

(76) Inventors: Jon Simon Gillespie-Brown, Portola Valley, CA (US); Thomas Erik Meyerhoffer, Montara, CA (US)

(*) Notice: Subject to any disclaimer, the term of this patent is extended or adjusted under 35 U.S.C. 154(b) by 1195 days.

(21) Appl. No.: 13/234,321

(22) Filed: Sep. 16, 2011

(65) Prior Publication Data

US 2012/0241567 A1  Sep. 27, 2012

Related U.S. Application Data

(60) Provisional application No. 61/440,107, filed on Feb. 7, 2011, provisional application No. 61/393,580, filed on Oct. 15, 2010.

(51) Int. Cl.
*F16M 13/00* (2006.01)
*F16M 13/02* (2006.01)
*B60R 11/00* (2006.01)
*F16M 11/04* (2006.01)
*F16M 11/06* (2006.01)
*F16M 11/14* (2006.01)
*F16M 11/20* (2006.01)
(Continued)

(52) U.S. Cl.
CPC ............. *F16M 13/022* (2013.01); *B60R 11/00* (2013.01); *F16M 11/041* (2013.01); *F16M 11/06* (2013.01); *F16M 11/14* (2013.01); *F16M 11/2021* (2013.01); *F16M 11/22* (2013.01); *F16M 11/28* (2013.01); *F16M 13/00* (2013.01); *F16M 2200/022* (2013.01); *F16M 2200/044* (2013.01); *F16M 2200/065* (2013.01)

(58) Field of Classification Search
CPC ... F16M 13/022; F16M 11/041; F16M 11/06; F16M 11/14; F16M 11/2021; F16M 11/22; F16M 11/28; F16M 13/00; F16M 2200/022; F16M 2200/044; F16M 2200/065; B60R 11/00
USPC .......... 248/27.8, 458, 462, 125.7, 418, 206.5, 248/918, 919, 181.2, 288.31, 421, 431, 248/346.3, 346.01, 370, 432, 188.9, 164; 108/43
See application file for complete search history.

(56) References Cited

U.S. PATENT DOCUMENTS 1,759,165 A * 5/1930 Mayer ......................... 248/182.1
5,342,364 A   8/1994 Mikhail
(Continued)

OTHER PUBLICATIONS

International Search Report and Written Opinion from the corresponding application No. PCT/US2011/056353 dated Feb. 29, 2012.

*Primary Examiner* — Gwendolyn Baxter
(74) *Attorney, Agent, or Firm* — Seyfarth Shaw LLP; Brian Michaelis

(57) ABSTRACT

In an illustrative embodiment, a device stand including a holder, a holder mount, and a base is disclosed herein. In this illustrative embodiment, the holder includes a central support, a plurality of arms extending from the central support, and a gripping portion configured to grip a corner of a device coupled to each of the plurality of arms. The holder also includes at least one mounting lock coupled to a back face of the support. The holder mount includes at least one mounting lock configured to removably couple to the at least one mounting lock on the holder. The holder mount may be attached to the base by an articulation joint. The articulation joint allows a user to manipulate the orientation of the holder in one or more planes for optimal use of a device held within the holder.

5 Claims, 12 Drawing Sheets

(51) Int. Cl.
*F16M 11/22* (2006.01)
*F16M 11/28* (2006.01)

(56) References Cited

U.S. PATENT DOCUMENTS

| | | | |
|---|---|---|---|
| 6,080,162 A | 6/2000 | Dye et al. | |
| 6,220,556 B1 * | 4/2001 | Sohrt et al. | 248/279.1 |
| 7,380,765 B2 * | 6/2008 | Shiff | 248/448 |
| 7,582,828 B2 | 9/2009 | Ryan | |
| 7,758,001 B2 | 7/2010 | Bouissiere | |
| 7,984,886 B2 * | 7/2011 | Lin | 248/181.1 |
| 8,016,255 B2 | 9/2011 | Lin | |
| 8,066,241 B2 * | 11/2011 | Yu et al. | 248/286.1 |
| 8,138,869 B1 | 3/2012 | Lauder et al. | |
| 8,143,983 B1 | 3/2012 | Lauder et al. | |
| 8,242,868 B2 | 8/2012 | Lauder et al. | |
| 9,038,971 B1 * | 5/2015 | Guthrie | F16M 13/022 248/121 |
| 2004/0232291 A1 | 11/2004 | Carnevali | |
| 2008/0315052 A1 | 12/2008 | Woods et al. | |
| 2009/0230161 A1 | 9/2009 | Emsky | |
| 2011/0267757 A1 | 11/2011 | Probst et al. | |
| 2011/0287808 A1 | 11/2011 | Huang | |
| 2012/0024741 A1 | 2/2012 | Beatty et al. | |
| 2012/0024920 A1 | 2/2012 | Grolle et al. | |
| 2012/0056061 A1 | 3/2012 | Van Kuijk et al. | |
| 2012/0068797 A1 | 3/2012 | Lauder et al. | |
| 2012/0068798 A1 | 3/2012 | Lauder et al. | |
| 2012/0069503 A1 | 3/2012 | Lauder et al. | |
| 2012/0103855 A1 | 5/2012 | Gaddis, II et al. | |
| 2012/0106059 A1 | 5/2012 | Probst et al. | |
| 2012/0106060 A1 | 5/2012 | Probst et al. | |
| 2012/0106061 A1 | 5/2012 | Probst et al. | |
| 2012/0106062 A1 | 5/2012 | Probst et al. | |
| 2012/0106078 A1 | 5/2012 | Probst et al. | |
| 2012/0111881 A1 | 5/2012 | Gaddis, II et al. | |
| 2012/0113572 A1 | 5/2012 | Gaddis, II et al. | |
| 2012/0325702 A1 | 12/2012 | Gallagher et al. | |
| 2013/0027867 A1 | 1/2013 | Lauder et al. | |

* cited by examiner

MULTIMEDIA DEVICE STAND

CROSS REFERENCES TO RELATED APPLICATIONS

This application claims the benefit of U.S. Provisional Patent Application Ser. No. 61/393,580, filed on Oct. 15, 2010, and U.S. Provisional Patent Application Ser. No. 61/440,107, filed on Feb. 7, 2011, both of the contents of which are incorporated herein by reference in their entirety.

FIELD

The present disclosure relates to device stands. More particularly, the present disclosure relates to device stands for electronic devices.

BACKGROUND

Generally, there are a number of ways to mount electronic devices for daily use. However, most of them have a wide range of limitations. One limitation relates to the ability to orientate the devices for ease of use or viewing in various daily activities, for example placing the devices in a vehicle or for viewing on a desktop along with many other ways consumers may wish to support and use these devices.

Older stand designs are generally designed for a specific fixed form factor and are not adjustable to be used for various types or sizes of devices and they also restrict the orientation, height and position of the devices. Older stand designs also generally have either permanent or mechanical mounting solutions that hold the device in the stand making it difficult or impossible to easily and quickly transfer the device from one mounting solution to another. Most of the older stand designs tend to be for a specific device and specific application and therefore by their very nature are uni-functional and restricted in their use.

In addition, there are issues with the security and subsequent theft risk in using these devices as most mounts do not have any inherent "protection" features to prevent casual theft or removal from their work place. For example, in commercial uses mounting and protecting the devices from theft are of paramount concern as tablet devices are valuable and attractive to casual thieves, staff, and the general public. In addition, the devices may serve limited functions for commercial usage without a means to mount the devices in a position and orientation for the required tasks or uses, i.e. for mounting on a museum wall. Generally, the devices need to be mounted in a secure system that allows for adaptability of viewing and/or interaction angles.

SUMMARY

In an illustrative embodiment, an adjustable device stand is disclosed herein. The adjustable device stand seeks to cure the above limitations by including an adjustable holder and support system that allows for a secure grip of various sizes and form factors of modern devices and allows for these to be mounted in many ways to provide for many use cases (for example, easily switching from using in the kitchen to the bedroom or from a table top view to a seated view for example) so that the user is not limited in the manner of use of the device. Thus, the adjustable device stand can be utilized across many personal and commercial use cases.

In an illustrative embodiment, the adjustable device holder and stand includes articulating parts that facilitate the viewing and use of the devices in various orientations that are optimum for such purposes. For example, some tablet computers have glass based screens that are highly reflective. These screen types generally should be positioned away from light sources in order to reduce reflections. Additionally, children and adults may have different optimal viewing angles. The adjustable device stands disclosed herein allow for the viewing angles and heights to be adjusted so as to offer optimal viewing angles away from light sources in order to reduce reflections, and optimal heights and distances for the audience, for example children vs. adults. In an illustrative embodiment, the adjustable device holder and stand includes a holder, a holder mount, and a base. The holder may include a support, a plurality of arms extending from the support, and a gripping portion configured to grip a corner of a device coupled to each of the plurality of arms. The holder may also include at least one mounting lock coupled to a back face of the support.

The holder mount may include at least one corresponding mounting lock configured to removably couple to the mounting lock of the holder. In this illustrative embodiment the mounting locks of the holder and holder mount are magnets. The holder mount may be attached to the base by an articulation joint, for example a ball joint. The articulation joint allows a user to manipulate the orientation of the holder in one or more planes for optimal use of a device held within the holder.

A set of base attachments that allow for the positioning and support of the devices for various uses such as on a table top, for holding at waist height, for mounting in a vehicle, for mounting on a wall, for mounting on a computer monitor, for mounting on other surfaces, and/or for standing height or sitting height may be implemented to allow for different ranges of use and functionality. For example, the bases may include an extension that is connected to the articulation joint. In one illustrative embodiment, a ball portion of the articulation joint is attached to the extension, and the ball is connected to a corresponding socket in a back of the holder mount. The extension may also include another or second articulation joint along the length of the extension. The extension may be connected to a mounting plate, base plate, a vehicle mounting bracket, or other type of base, mount bracket, and/or support.

In another illustrative embodiment, the device holder may include first support having a first end and a second end, and a second support having a first end and a second end. The first support may include first slots located on the first end and second end of the first support. Additionally, the second support may include second slots located on the first end and second end of the second support. A first cross support extends between the second end of the first support and the first end of the second support. The first cross support further includes moveable/slideable rivets located on the ends of the first cross support. The slideable rivets engage one slot on the second end of the first support and one slot on the first end of the second support. Similarly, the second cross support extends between the first end of the first support and the second end of the second support. The second cross support further includes moveable/slideable rivets on the ends of the second cross support. The slideable rivets engage one slot on the first end of the first support and one slot on the second end of the second support. The first cross support and the second cross support cross one another at a point along the length of the first and second cross supports. The slideable rivets are configured to slide within the slots allowing the first support and the second cross support to collapse towards each other and extend away from each other. Additionally, a locking mechanism may be attached to the holder to lock the first support and the second support in a desired position.

The device holder may further include a support pad coupled to the first cross support and the second cross support where the second cross support crosses the first cross support. Additionally, a plurality of gripping members may be rotatably coupled to each of the first support and the second support along the length of the first support and the second support. The gripping members may rotate or fold onto the first support and the second support for example, to avoid damaging, impeding or pressing speakers, ports and/or various switches located on a device.

The device holder may further include an articulation joint coupled to a back of the holder allowing a user to manipulate the orientation of the holder in one or more planes. Further, a universal connection/connector may be attached to the back of the holder for attaching the holder to a set of base attachments that allow for the positioning and support of the holder and device for various uses such as on a table top, for holding at waist height, for mounting in a vehicle, for mounting on a wall, for mounting on a computer monitor, for mounting on other surfaces, and/or for standing height.

BRIEF DESCRIPTION OF THE DRAWINGS

Embodiments of the adjustable device holders and stands are illustrated in the figures of the accompanying drawings which are meant to be exemplary and not limiting, in which like references are intended to refer to like or corresponding parts, and in which.

DETAILED DESCRIPTION

Detailed embodiments of adjustable device stands are disclosed herein, however, it is to be understood that the disclosed embodiments are merely exemplary of the adjustable device stands, which may be embodied in various forms. Therefore, specific functional details disclosed herein are not to be interpreted as limiting, but merely as a basis for the claims and as a representative basis for teaching one skilled in the art to variously employ the present disclosure.

Generally, the adjustable device stands disclosed herein provide adjustable mounting arrangements for modern electronic devices of various shapes and form factors, such as but not limited to tablet computing and multimedia devices (for example, electronic readers, Apple iPads®, DVD players, and other tablet or slate type devices), laptop computing and multimedia devices (for example, laptop computers, DVD players, and other folding or clamshell type devices), televisions, computer monitors, video gaming devices, and other devices of the type. In an illustrative embodiment, the adjustable device stands are configured to hold the back of tablet or slate type devices, and the bottom of folding or clamshell type devices.

In an illustrative embodiment, the adjustable device stands allow for devices of varying heights, widths and depths to be secured in the stands, and include one or more articulating portions allowing the orientation of the devices to be manipulated in one or more planes for optimal use. For example, the adjustable device stands allow for devices to be removably mounted in a vertical position. This is useful in for example restaurants where a host may remove a device from the stand and use the device to seat people while allowing the host to return the device to its original position on the stand quickly and securely. Other examples of use include factory environments, stores, and museums.

Figure 1:
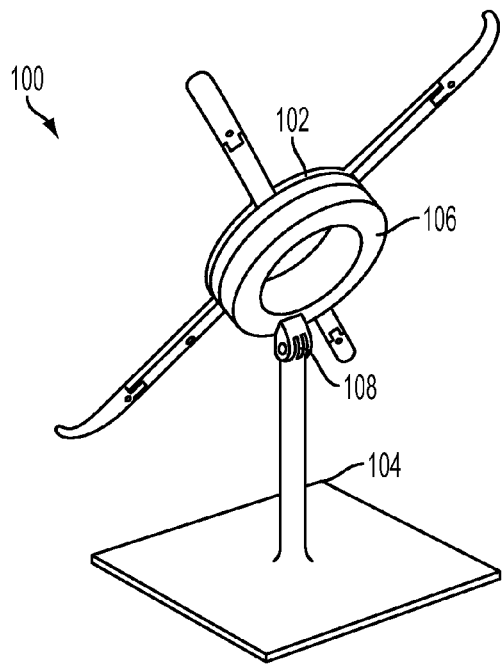
FIG. 1 illustrates one embodiment of a device stand, according to the invention.

A device stand according to an illustrative embodiment is described with reference to FIGS. 1-3. As illustrated, a device stand 100 includes a cradle or holder 102 configured to hold a device, a base 104, and a cradle or holder mount 106. In this illustrative embodiment, the holder 102 may be removably attached or mounted to the holder mount 106 allowing a user to disconnect the holder 102 from the holder mount 106. The holder mount 106 may also be connected to the base 104 by an articulation joint 108. In an illustrative embodiment, the articulation joint 108 is configured to rotate around one or more axes, including a vertical axis and/or a horizontal axis, for example by tilting or swiveling forwards and backwards, allowing the user to manipulate the orientation of the holder 102 in one or more planes for optimal use. In one illustrative embodiment, the articulation joint 108 is configured to rotate in 90 degree increments allowing the user to switch between a vertical or portrait orientation and a horizontal or landscape orientation of the device.

Figure 2:
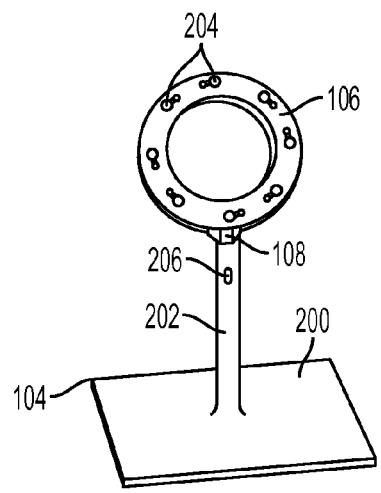
FIG. 2 illustrates a base and a holder mount of the device stand illustrated in FIG. 1.

Referring to FIG. 2, the base 104 may include a base plate or floor plate 200 and an extension 202 extending vertically upward from the base plate 200. The articulation joint 108 is typically connected or mounted to the extension 202 opposite the base plate 200, and the holder mount 106 is connected to the articulation joint 108. In an illustrative embodiment, the holder mount 106 includes one or more mounting locks 204 configured to couple the holder 102 to the holder mount 106. In this illustrative embodiment, the holder mount 106 is circular in shape and the mounting locks 204 include magnets that are radially spaced around the circumference of the holder mount 106.

Figure 3:
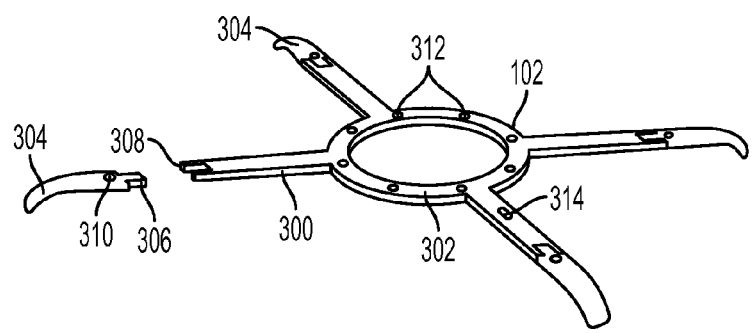
FIG. 3 illustrates a holder of the device stand illustrated in FIG. 1.

Referring to FIG. 3, the holder 102 may include at least two arms 300 configured to grip or hold a device. As illustrated the holder 102 includes four arms 300 attached to, or monolithically formed as a single piece with the holder 102. The arms 300 may be positioned to extend radially outward from a centrally located support 302. Typically, the arms 300 are spaced to grip, hold, or engage the corners of the device allowing the speakers, switches, and/or ports on the device to be accessible. Each of the arms 300 may include a gripping portion or member 304 configured to grip the corners of the device and securely hold the device within the holder 102. In an illustrative embodiment, the device may be placed in the holder 102 with a back or bottom of the device facing the arms 300, and the gripping portions 304 may extend over the corners of the device.

The gripping portions 304 may be attached to the arms 300 via fasteners, including but not limited to screws, bolts, pins, and other fasteners of the type. In this illustrative embodiment, the gripping portions 304 are attached to the arms 300 in a tongue and groove manner, wherein the gripping portions 304 include a tongue 306 and the arms 300 include a corresponding groove 308. The tongue 306 may be placed in the groove 308 and the gripping portions 304 may be attached to the arms 300 by inserting the fasteners into a corresponding fastener aperture 310. In other embodiments, the gripping portions 304 may be monolithically formed from a single piece with the arms 300, telescopically mounted to the arms 300 or slideably mounted to the arms 300, for example via detents and detent protrusions, allowing the position and length of the gripping portions 304 to be adjusted to fit varying sizes of devices.

The holder 102 may further include mounting locks 312 configured to engage and/or mate with the mounting locks 204 of the holder mount 106. The mounting locks 312 and 204 may permanently secure the holder 102 to the holder mount 106, or temporarily secure the holder 102 to the holder mount 106 allowing the holder 102 to be removed from the holder mount 106. In this illustrative embodiment, the mounting locks 312 include magnets that are radially spaced substantially around the circumference of the centrally located support 302. Typically, the mounting locks 312 are located on a back face of the holder 102 or support 302 allowing the mounting locks 312 to be exposed when the device is inserted into the holder 102. This allows the mounting locks 312 on the holder 102 to engage the mounting locks 204 on the holder mount 106, via magnetic interaction(s), and removably secure the holder 102 to the holder mount 106 when the device is inserted into the holder 102.

In an illustrative embodiment, referring to FIGS. 2 and 3, the base 104 may include a security attachment point 206 and the holder 102 may include a corresponding security attachment point 314. The security attachment points 206 and 314 may be configured to lock the holder 102 to the holder mount 106 or base 104 to prevent an unauthorized person from removing the holder 102, including a device mounted on the holder 102, from the holder mount 106 or base 104. This security feature may be commonly used in commercial applications to prevent or protect against casual theft of the device or removal, for example from the work place. The security attachment points 206 and 314 may be any type of locking device, including but not limited to a lock and key device, cable or wire attachment points such as a Kensington lock mechanism, a loop that extends through an aperture such as for insertion of a pad lock, apertures for insertion of fasteners, a magnetic lock, and other locking devices of the type.

Figure 4:
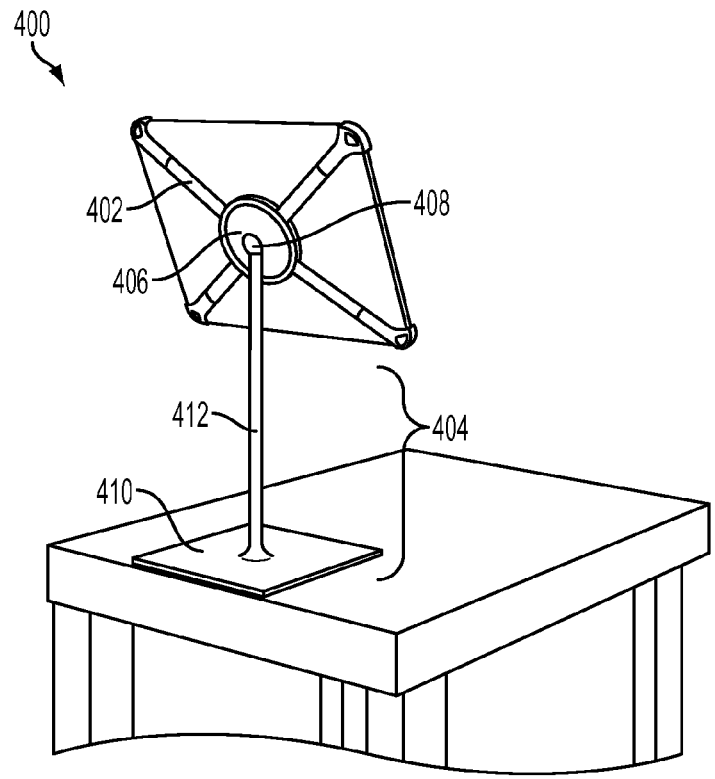
FIG. 4 illustrates another embodiment of a device stand.

Another device stand according to an illustrative embodiment is described with reference to FIGS. 4-6. Similar to the device stand 100, the device stand 400 includes a cradle or holder 402 configured to hold a device, a base 404, and a cradle or holder mount 406. The base 404 may include a base plate or floor plate 410 and an extension 412 extending vertically upward from the base plate 410, as described above with reference to the device stand 100. In this illustrative embodiment, the holder mount 406 is connected to the base 404 by an articulation joint 408. The articulation joint 408 may be a ball joint configured to rotate around one or more axes, including a vertical axis, and/or a horizontal axis, for example by tilting forwards and backwards, allowing the user to manipulate the orientation of the holder 402 in one or more planes for optimal use.

Figure 5:
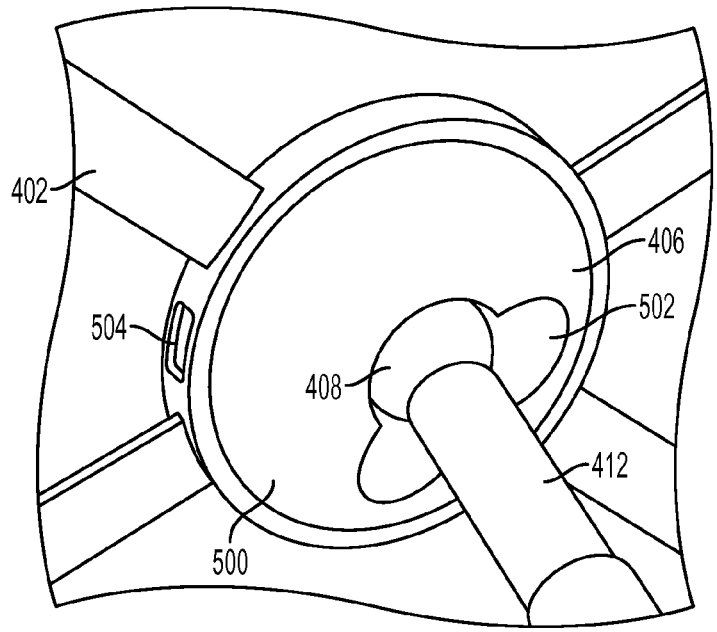
FIG. 5 illustrates a holder mount of the device stand illustrated in FIG. 4.

Referring to FIG. 5, the articulation joint 408 includes a ball connected to or as part of the extension 412 received in or coupled to a socket positioned in a central portion of a back 500 of the holder mount 406. The holder mount 406 may also include one or more notches or indentations 502 located in the back 500 of the holder mount 406. The notches 502 may be sized to receive at least a portion of the articulation joint 408 and/or the extension 412 allowing the holder mount 406 to be oriented in a vertical position. In this illustrative embodiment, the notches 502 are positioned perpendicular to one another. This allows the holder mount 406 to be oriented to hold a device in a landscape or portrait position. However, it should be appreciated that the notches 502 may be positioned in other orientations.

Figure 6:
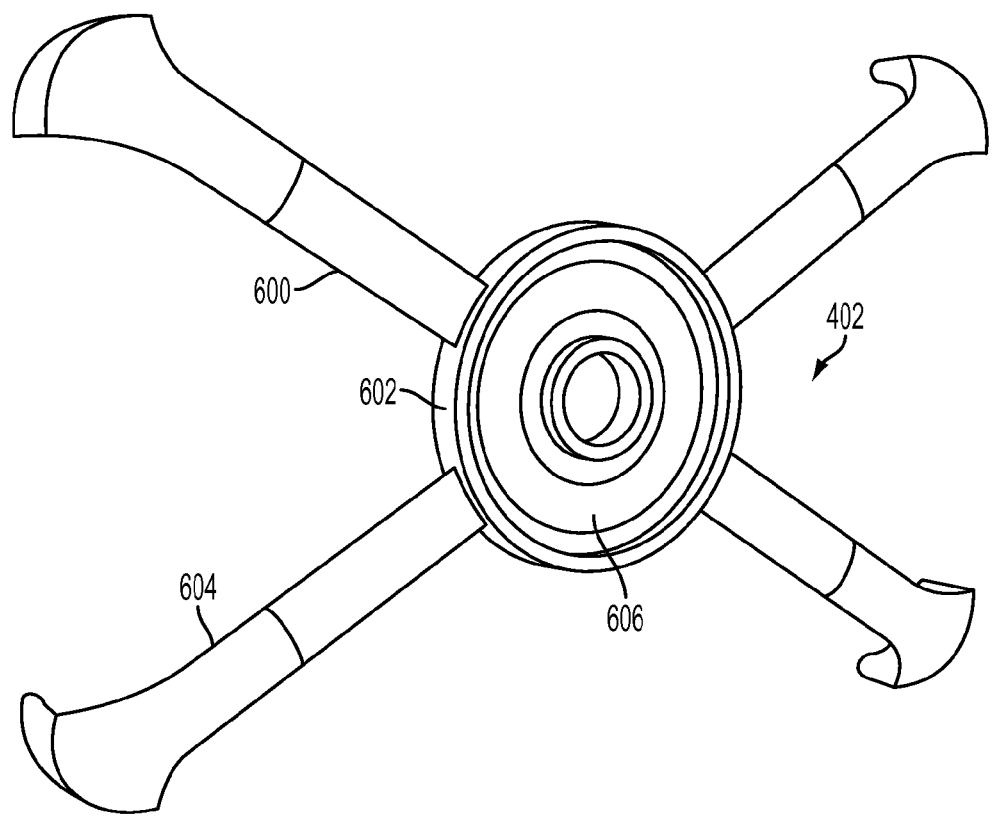
FIG. 6 illustrates a holder of the device stand illustrated in FIG. 4.
Figure 7:
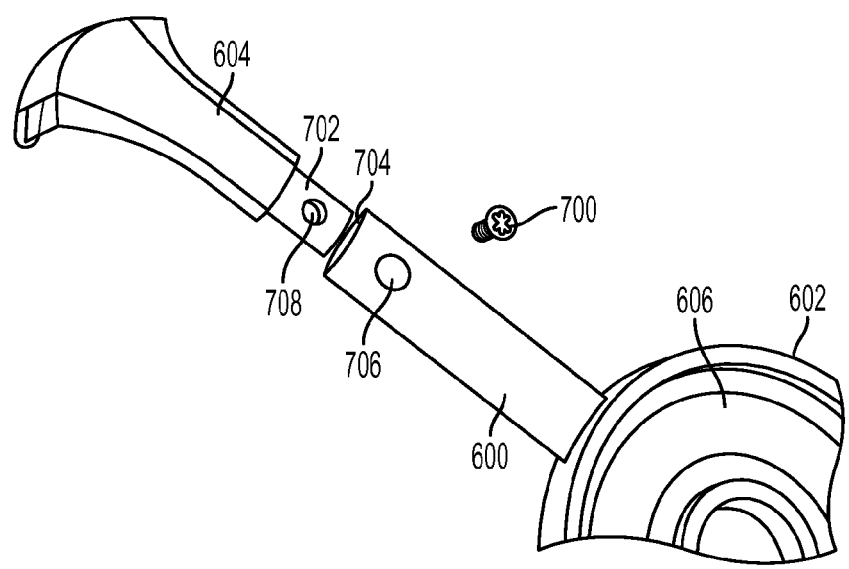
FIG. 7 illustrates an arm of the holder of the device stand illustrated in FIG. 6.

Referring to FIGS. 6 and 7, similar to the holder 102, the holder 402 may include arms 600 configured to grip or hold a device. The arms 600 may extend radially outward from a centrally located support 602. Typically, the arms 600 are spaced to grip, hold, or engage the corners of the device allowing the speakers, switches, and/or ports on the device to be accessible. Further, each of the arms 600 include a gripping portion 604 configured to grip the corners of the device and securely hold the device within the holder 402. The gripping portions 604 may be attached to the arms 600 via fasteners 700, including but not limited to screws, bolts, pins, and other fasteners of the type. In this illustrative embodiment, the gripping portions 604 may include a protrusion or insertion portion 702. The insertion portion 702 may be configured to be inserted into a corresponding aperture 704 in the arms 600. For example, the insertion portion 702 may be placed in the aperture 704 and the gripping portions 604 may be attached to the arms 600 by inserting the fasteners 700 into corresponding fastener apertures 706 and 708 in the arms 600 and the gripping portions 604, respectively. Similar to above, in other embodiments, the gripping portions 604 may be monolithically formed from a single piece with the arms 600, telescopically mounted to the arms 600 or slideably mounted to the arms 600, for example via detents and detent protrusions, allowing the position and length of the gripping portions 604 to be adjusted to fit varying sizes of devices.

The holder 402 may further include one or more mounting locks 606 configured to engage and/or mate with one or more corresponding mounting locks (not shown) on the holder mount 406. In this illustrative embodiment, the mounting lock 606 and the corresponding mounting lock on the holder mount 406 are magnets. The mounting lock 606 is positioned in a back face of the support 602, and the corresponding mounting lock on the holder mount 406 is positioned in a front face of the holder mount 406. The mounting locks may permanently secure the holder 402 to the holder mount 406, or temporarily secure the holder 402 to the holder mount 406 allowing the holder 402 to be removed from the holder mount 406. In this illustrative embodiment, the magnetic mounting lock 606 and the corresponding mounting lock on the holder mount 406 allow the holder 402 to be removably attached or mounted, via magnetic interaction(s), to the holder mount 406 allowing a user to disconnect the holder 402 from the holder mount 406.

Referring back to FIG. 5, the holder 402 may further include a security attachment point 504. The security attachment point 504 may be configured to lock the holder 402 to the holder mount 406 or to another secure point to prevent an unauthorized person from removing the holder 402, including a device mounted on the holder 402. In this illustrative embodiment, the security attachment point 504 is a Kensington lock mechanism that allows for the connection of various industry standard cables or wires and locking devices to be attached to the holder 402 and/or the holder mount 406 to prevent casual removal of the holder 402, as the holder 402 may be tethered via the security attachment point 504 to a secure point such as a table or another secure attachment point. However, the security attachment point 504 may be any type of locking device, as described above with reference to the device stand 100.

While the device stands 100 and 400 are illustrated as having circular shaped support of the holders and holder mounts, the support of the holders and holder mounts may be any of various geometric shapes including but not limited to a square, a trapezoid, a circle, an oval, a polygon, a triangle, or other geometric shapes. Further, the mounting locks or magnets may have any geometric shape corresponding to the geometric shape of the support of the holder and holder mount, or may include more than one mounting lock or magnet spaced at any location on the support of the holder and corresponding holder mount, for example on a perimeter, a circumference, centrally located, and/or any other position on the support of the holder and corresponding holder mount.

In an illustrative embodiment, the gripping portions 304 and 604 of the device stands 100 and 400, respectively, may be made of a flexible material including but not limited to a soft rubber, a polymer, a composite, and/or other flexible materials that allow for the device to be pushed in and pulled out of the holder easily. In another illustrative embodiment, the gripping portions 304 and 604 of the device stands 100 and 400, respectively, may be made of a strong non-flexible material including but not limited to a metal, a composite, a non-flexible polymer, or other material or combination of materials of the type that does not allow the device to be pushed in and pulled out of the holder. In this illustrative embodiment, the gripping portions 304 and 604 are configured to secure the device into the holder and the device cannot be removed unless the gripping portions 304 and 604 are unsecured manually, for example by removing the fasteners, for anti-theft purposes.

The gripping portions 304 and 604 of the device stands 100 and 400, respectively, may also be designed to fit a specific form factor of a device. The gripping portions 304 and 604 may also be interchangeable or removable from the arms 300 and 600. The ability to change the gripping portions 304 and 604 attached to the arms 300 and 600 allows the system to easily adapt to a specific form factor of numerous devices.

In an illustrative embodiment, the arms 300 and 600 of the device stands 100 and 400, respectively, may be adjustably attached to the holder 102 and 402. For example, the arms 300 and 600 may be configured to slide, ratchet, or move radially around at least a portion of the supports 302 and 602, respectively, allowing the arms to be positioned in alignment with the corners of varying sizes of devices. Further, the arms 300 and 600 may be telescoping, extendable and/or retractable allowing the length of the arms 300 and 600 to be adjusted to fit and hold varying sizes of devices.

In an illustrative embodiment, the holder, such as the holder 102 and/or 402, or the mounting locks, such as the mounting locks 312 and/or 606, may be integrated directly into a cover or casing of a device. For example, the holder and/or the mounting locks may be formed as a single piece with the cover or casing of the device. When the holder is integrated into a cover or casing of the device, the holder may not include arms, such as the arms 300 and/or 600, since the holder does not need to grip the corners of the device. For example, only the mounting locks of the holder and/or the central support of the holder may be integrated into a cover or casing of the device. The holder mount, such as the holder mount 106 and/or 406, or the mounting locks, such as the mounting locks 204, may also be integrated directly into a wall, furniture, or other area.

In an illustrative embodiment, the holder, such as the holder 102 and/or 402, or the mounting locks, such as the mounting locks 312 and/or 606, may include or be integrated with other technologies. For example, an electronic tracking device may be integrated into the holders and/or mounting locks, accessories including but not limited to speakers, cable holders, and other device accessories may be integrated with the holders and/or mounting locks.

In an illustrative embodiment, the devices 100 and 400 may further include locking mechanisms or articulation locks, configured to lock or hold the articulation joints 108 and/or 408 in a desired orientation or at a desired angle. This may allow for the user to swivel the holder on one axis to a desired orientation, for example a landscape or portrait type orientation based on the device use and type, and lock the holder in the desired orientation. The user may also tilt the holder on another axis to place the device in the desired angular orientation for optimal viewing, and lock the holder in the desired orientation.

In an illustrative embodiment, the base of the device stands may be modified to provide for different uses. For example, a set of base attachments that allow for the positioning and support of the devices for various uses such as on a table top, for holding at waist height, for mounting in a vehicle, for mounting on a wall, for mounting on a computer monitor, for mounting on other surfaces, and/or for standing height may be implemented to allow for different ranges of use and functionality. Alternative embodiments of various base configurations are illustrated in FIGS. 8-13.

Figure 8:
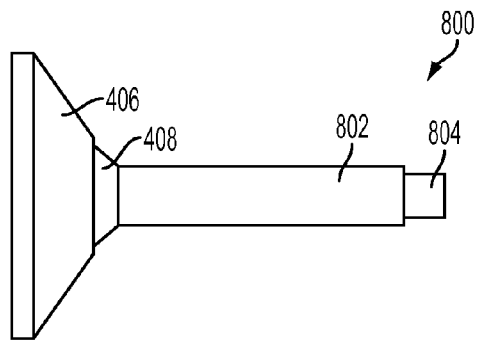
FIG. 8 illustrates an embodiment of an adaptor base.
Figure 9:
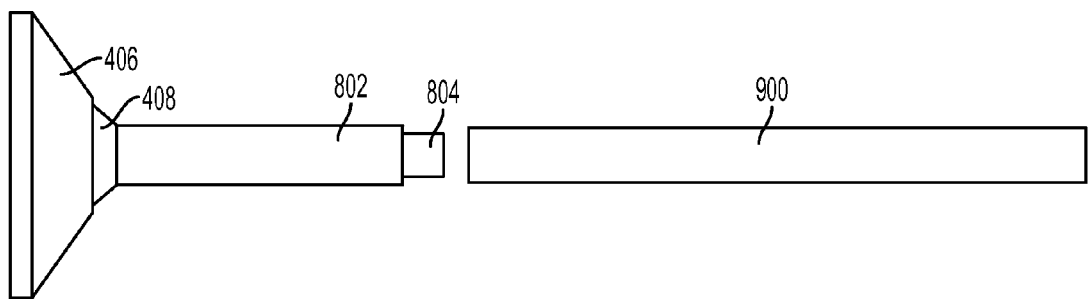
FIG. 9 illustrates the adaptor base and an extension for the adaptor base.

Referring to FIG. 8, the base may be an adaptor base 800. In an illustrative embodiment, the adaptor base 800 includes an adaptor extension 802 having a connection point 804 on a first end. As illustrated the connection point 804 is a male connector having threads for threading into a female connector having corresponding threads. Further, the holder mount 406 and articulation joint 408 may also be attached to the adaptor extension 802 on a second end distal to the first end. In other embodiments, the connection point 804 may be a female connection point, or other connection point, such as a slide in adaptor, a snap in adaptor, or other connection point of the type. Referring to FIG. 9, the adaptor extension 802 may be connected to an end of an extension 900 configured to connect to the adaptor extension 802. The extension 900 may also include an articulation joint and/or a floor plate similar to the articulation joints and floor plate described above.

Figure 10:
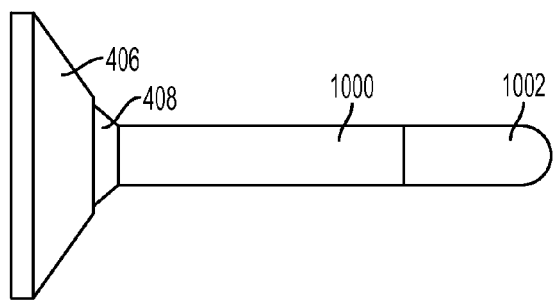
FIG. 10 illustrates an embodiment of a base having a grip or foot.

Referring to FIG. 10, the base may include an extension 1000 and a grip or rubber foot 1002 on a first end. The holder mount 406 and articulation joint 408 may also be attached to the extension 1000 on a second end distal to the first end. The extension 1000 may be an extension similar to the adaptor extension 802, and the foot 1002 may have a connection point configured to removably connect to the extension 1000.

Figure 11:
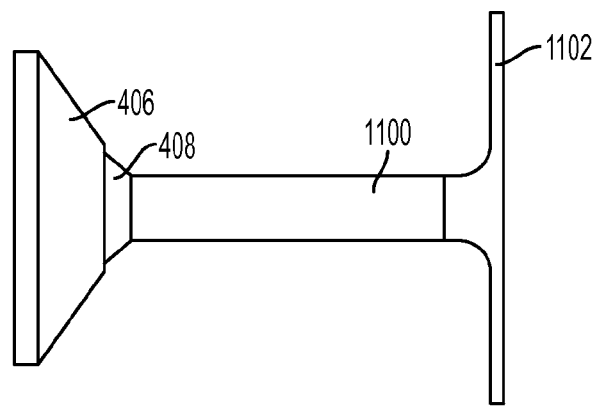
FIG. 11 illustrates an embodiment of a mounting base.

Referring to FIG. 11, the base may include an extension 1100 and a mounting plate 1102 on a first end for mounting on a wall, monitor, cabinet, floor, table, desk, ceiling, or other suitable surface. The mounting plate 1102 may include one or more apertures or other fastening adoptions based on the different applications. For example, the base designs may include one or more apertures for attachment to various surfaces, posts, and other structures. The mounting plate 1102 may include adhesive glues or tapes for attaching to other devices, surfaces, or bases. The holder mount 406 and articulation joint 408 may also be attached to the extension 1100 on a second end distal to the first end. Similar to embodiments described above, the extension 1100 may be an extension similar to the adaptor extension 802 described above with reference to FIG. 8, and the mounting plate 1102 may have a connection point configured to removably connect to the extension 1100.

Figure 12:
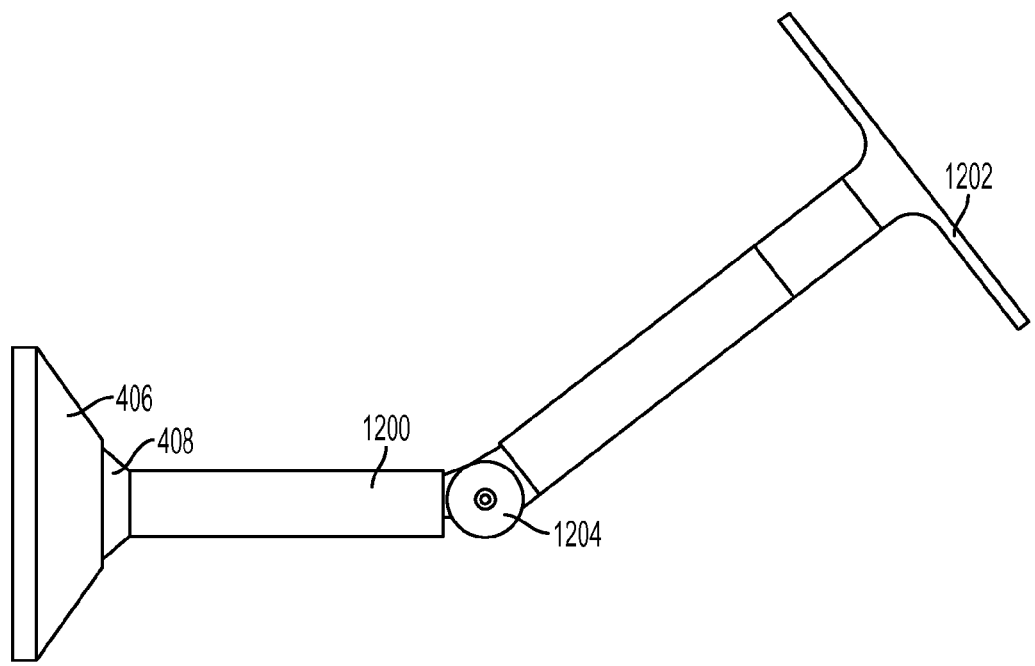
FIG. 12 illustrates an embodiment of a mounting base including an articulating extension.

Referring to FIG. 12, the base may include an articulating extension 1200 and a mounting plate 1202, such as the mounting plate 1102 described above, on a first end for mounting on a wall, monitor, cabinet, floor, table, desk, ceiling, or other suitable surface. The holder mount 406 and articulation joint 408 may also be attached to the extension 1200 on a second end distal to the first end. In this illustrative embodiment, the articulating extension 1200 includes an articulation joint 1204. The articulation joint 1204 may be configured to rotate around one or more axes, allowing the user to manipulate the orientation of the articulating extension 1200 in one or more planes for optimal use. Similar to embodiments described above, the extension 1200 may have a connection point similar to that of the adaptor extension 802, and the mounting plate 1202 may have a connection point configured to removably connect to the extension 1200.

Figure 13:
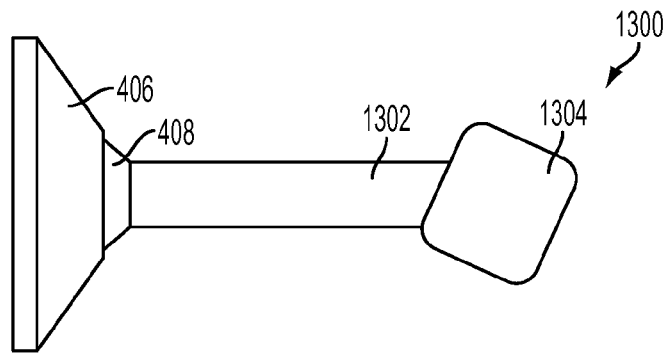
FIG. 13 illustrates an embodiment of a vehicle mounting base.
Figure 14:
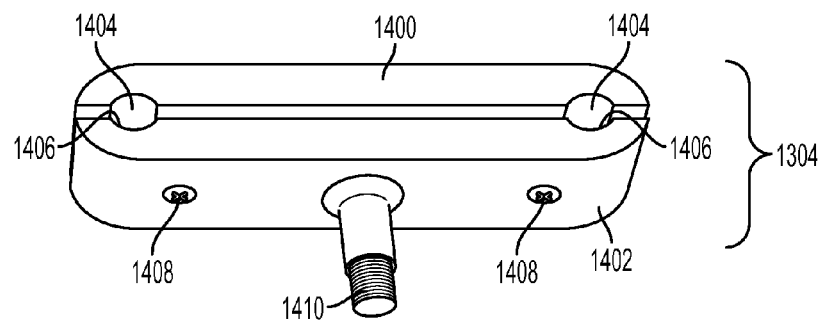
FIG. 14 illustrates an embodiment of a bracket of the vehicle mounting base.

Referring to FIGS. 13-14, the base may be a vehicle mounting base 1300. The vehicle mounting base 1300 may include a stem or extension 1302 and a mounting bracket 1304 on a first end for mounting on a vehicle seat. The holder mount 406 and articulation joint 408 may also be attached to the extension 1302 on a second end distal to the first end. Referring to FIG. 14, in an illustrative embodiment, the mounting bracket 1304 may include a first bracket 1400 and a second bracket 1402. The first bracket 1400 includes first grooves 1404, and the second bracket 1402 includes second grooves 1406 that correspond to the first grooves 1404 of the first bracket 1400. Typically, the first grooves 1404 and the second grooves 1406 are positioned to engage the posts of a vehicle seat headrest. For example, the first and second brackets 1400 and 1402, respectively, may be placed under the seat headrest around the posts of the headrest and fastened together via fasteners 1408 to secure the mounting bracket 1304 to the headrest.

In this illustrative embodiment, the mounting bracket 1304 also includes a connection point 1410 having threads for threading into a female connector having corresponding threads attached to or formed on a face of the second bracket 1402. In other embodiments, the connection point 1410 may be a female connection point, or other connection point, such as a slide in adaptor, a snap in adaptor, or other connection point of the type. For example, the connection point 1410 may be connected to a corresponding connection point on the extension 1302. In other embodiments, the extension 1302 may further include one or more articulation joints, such as the articulation joint 1204 described above in connection with FIG. 12, to allow the orientation of a device connected to the mounting bracket 1304 to be oriented to an optimal position for use by a user.

Figure 15:
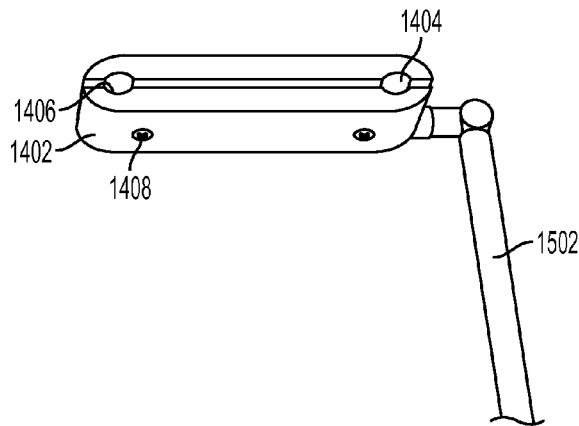
FIG. 15 illustrates an embodiment of another bracket of the vehicle mounting base.

Referring to FIG. 15, in another illustrative embodiment, an extension 1500 is attached to a side of the mounting bracket 1304 instead of the front face of the second bracket 1402. In this illustrative embodiment, the extension 1500 includes an articulation joint, similar to the articulation joint 1204 described above in connection with FIG. 12, to allow the orientation of a device connected to the mounting bracket 1304 to be oriented to an optimal position for use by a user. Similar to the embodiments described above, the extensions 1302 and 1502 may have a connection point similar to that of the adaptor extension 802, and the mounting bracket 1304 may have a connection point configured to removably connect to the extensions 1302 and 1502 allowing the extension to be removed and or changed. For example, an extension that is a single fixed length may be removed and replaced with an extension that includes an articulation joint or has a different length.

Further, while the bases and extension have been described above in relation to certain embodiments, the extension may be interchangeable between different bases, and/or may be adjustable in height or length. For example any of the extensions or stems described above may be telescoping to allow for the height or length of the extensions to be adjusted by a user for optimal use. Any of the extensions may include one or more articulation joints to allow the position and orientation of the extension to be manipulated.

Figure 16:
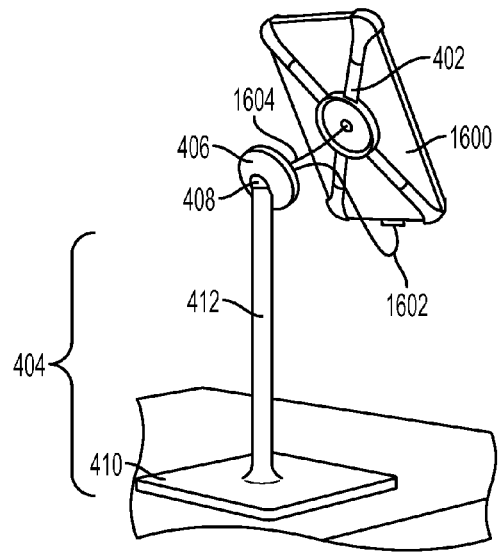
FIG. 16 illustrates an embodiment of a base incorporating a cable management option.

In another illustrative embodiment, any of the bases may furthering include a built in cable/cord management option to allow for concealing of all or part of any cables or cords extending from a particular device. For example referring to FIG. 16, the device stand 400 may include the cable management option. As illustrated, a device 1600 is being held in the holder 402. The device 1600 has a cable or cord 1602, for example a power cord, plugged into a port of the device 1600. The cord 1602 may be threaded through the holder mount 406 and into the base 404 for concealing the cord 1602. The base 404 may also have an aperture or groove on a bottom of the base plate 410 for allowing the cord to extend out of the base plate 410 and connect to a power source. Further, it should be appreciated that one or more additional cords/cables may be attached to ports of the device 1600 and threaded into the holder mount 406 and base 404 for concealment purposes. Additionally, a security cable 1604 may be attached to the holder 402 and threaded through the holder mount 406 and base 404 for connection to a security attachment point to prevent the device 1600 from being removed from the area.

While the different base designs are described above in relation to the holder mount 406 and the articulation joint 408, any of the different base designs may be modified and/or implemented for use with any of the embodiments of the holder mounts and articulation joints disclosed herein. For example, a base design including the holder mount 106 and the articulation joint 108 may be attached to any of the bases described above instead of the holder mount 406 and the articulation joint 408. In an illustrative embodiment, the different base designs and extensions may be attached directly to the holder mount(s) or mounting lock(s) described above.

Figure 17:
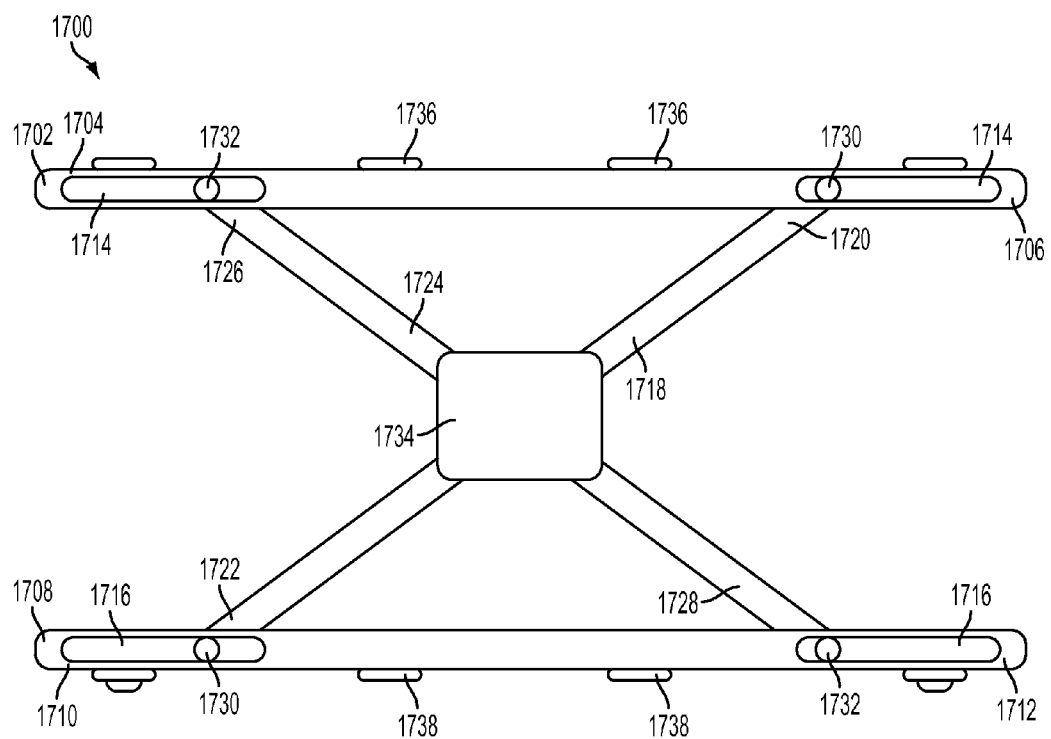
FIG. 17 illustrates an embodiment of a collapsible holder in an open position.
Figure 18:
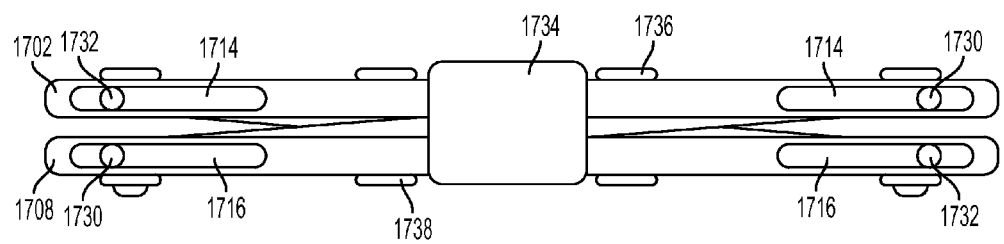
FIG. 18 illustrates the collapsible holder in a closed position.

In an illustrative embodiment, another cradle or holder device 1700 is described with reference to FIGS. 17-19. As illustrated, the holder 1700 includes a first support 1702 having a first end 1704 and a second end 1706, and a second support 1708 having a first end 1710 and a second end 1712.

The first support 1702 includes first slots 1714 located on the first end 1704 and second end 1706. Additionally, the second support 1708 includes second slots 1716 located on the first end 1710 and second end 1712.

The holder 1700 further includes a first cross support 1718 having a first end 1720 and a second end 1722, and a second cross support 1724 having a first end 1726 and a second end 1728. The first cross support 1718 extends between the second end 1706 of the first support 1702 and the first end 1710 of the second support 1708. The first cross support 1718 further includes moveable/slideable rivets 1730 located on the first end 1720 and the second end 1722. The slideable rivet 1730 on the first end 1720 is configured to engage the slot 1714 on the second end 1706 of the first support 1702 and the slideable rivet 1730 on the second end 1722 is configured to engage the slot 1716 on the first end 1710 of the second support 1708. Similarly, the second cross support 1724 extends between the first end 1704 of the first support 1702 and the second end 1712 of the second support 1708. The second cross support 1724 further includes moveable/slideable rivets 1732 located on the first end 1726 and the second end 1728. The slideable rivet 1732 on the first end 1726 is configured to engage the slot 1714 on the first end 1704 of the first support 1702 and the slideable rivet 1732 on the second end 1728 is configured to engage the slot 1716 on the second end 1712 of the second support 1708.

As illustrated, the first cross support 1718 and the second cross support 1724 cross one another at a central position along the first cross support 1718 and the second cross support 1724 forming an "X" between the first support 1702 and the second support 1708. As illustrated in FIG. 18, the slideable rivets 1730 and 1732 are configured to slide within the slots 1716 and 1714 allowing the first support 1702 and the second cross support 1708 to collapse towards each other and extend away from each other. For example as the first support 1702 and the second cross support 1708 are collapsed toward each other, the slideable rivets 1730 and 1732 move closer to the ends 1704, 1706, 1710, and 1712 of the first and second supports 1702 and 1708, and as the first support 1702 and the second cross support 1708 are extended away from one another the slideable rivets 1730 and 1732 move further away from the ends 1704, 1706, 1710, and 1712 of the first and second supports 1702 and 1708.

The holder 1700 may further include a support pad 1734. The support pad 1734 may be positioned at the central position, where the first cross support 1718 and the second cross support 1724 cross one another. The support pad 1734 may also include a spacer (not shown) to allow the first and second supports 1702 and 1708, and/or the first and second cross supports 1718 and 1724 to collapse under or behind the support pad 1734. The holder 1700 may also include one or more gripping members 1736 rotatably mounted on and positioned along the length of the first support 1702, and one or more gripping members 1738 rotatably mounted on and positioned along the length of the second support 1708.

Figure 20:
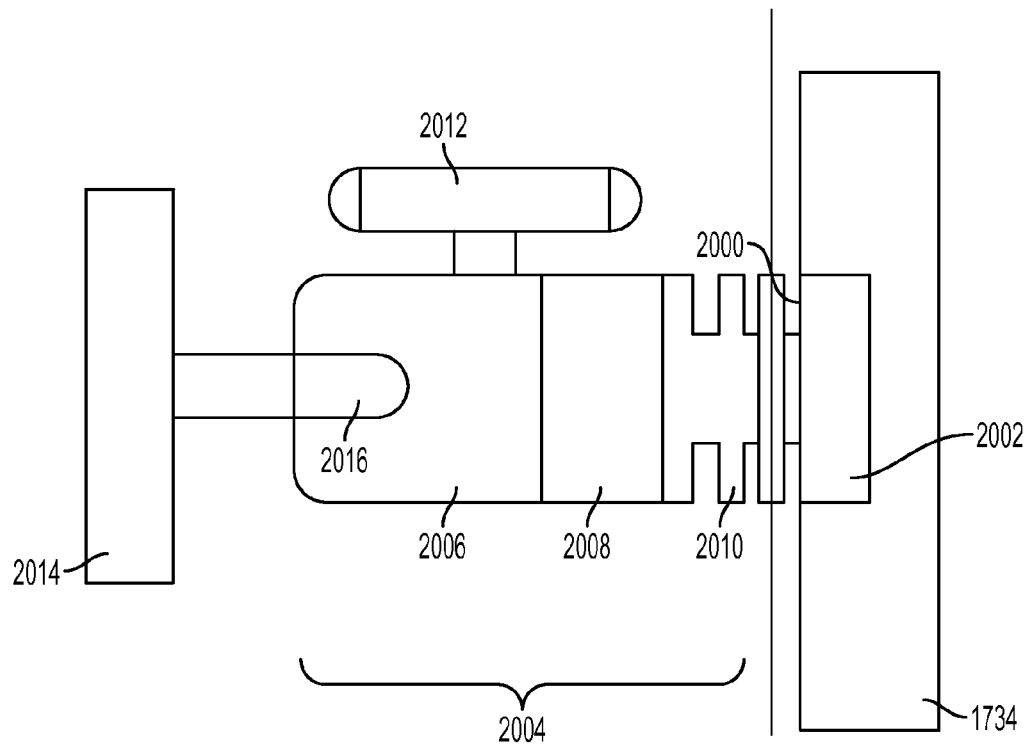
FIG. 20 illustrates an embodiment of a universal mount and articulation joint of the collapsible holder.

The collapsibility of the holder 1700 allows varying size devices to be placed into the holder 1700 and for the holder 1700 to collapse for ease of storage and portability. For example, a device may be placed into the holder 1700 with a back or a bottom of the device facing the support pad 1734. The first and second supports 1702 and 1708 may be collapsed until the gripping members 1736 and 1738 contact the edges of the device allowing the holder 1700 to securely hold the device in place. The slots 1716 and 1714 may also include pre-determined size markings and/or detents to allow a user to set the size of the holder 1700 for a certain size of device. Further, in the back of or behind the support pad 1734 may be a twist lock mechanism (illustrated in FIG. 20 described below) configured to lock the first and second cross supports 1718 and 1724 in place when the holder 1700 is collapsed around the device.

Figure 19:
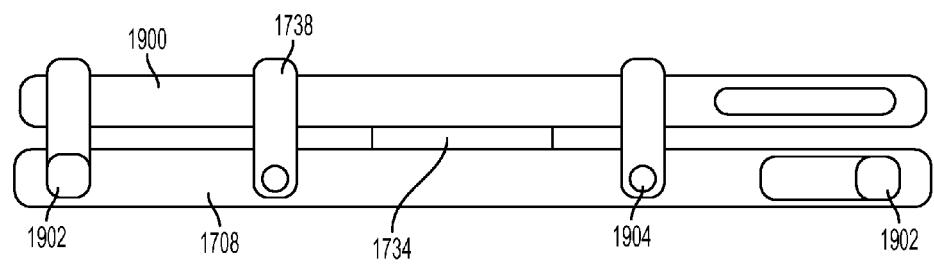
FIG. 19 illustrates a side view of the collapsible holder.

Referring to FIG. 19, a side view of the second support 1708 is illustrated. As illustrated a device 1900 is placed within the holder 1700. The gripping members 1738 are engaged with a side of the device 1900 securely holding the device 1900 within the holder 1700. The gripping members 1738 may be rotatably attached to the second support 1708 by rivets 1904 or other fasteners that allow the gripping members 1738 to rotate to engage the edge of the device 1900, and rotate or fold onto the second support 1708 for releasing the device 1900 from the holder 1700, and/or to avoid damaging, impeding or pressing speakers, ports and/or various switches located on the device 1900. Similarly, the gripping members 1736 may be rotatably attached to the first support 1702 in a similar manner.

The gripping members 1736 and 1738 may be made of a flexible and strong material so that when devices are pushed into the holder 1700 the gripping members 1736 and 1738 can move to accommodate such action without breaking. This flex may also add to the ability of the gripping members 1736 and 1738 to firmly grip or hold the device. In an illustrative embodiment, the gripping members 1736 and 1738 are made of aluminum, however gripping members 1736 and 1738 may be made of other materials, for example a metal, composite, and/or polymer, and may be coated on an interior surface and/or an exterior surface with a rubber or other anti-slip material. The gripping members 1736 and 1738 may have flat, wavy, or grooved interior surfaces that engage the device 1900 for holding the device 1900. Additionally, one or more of the gripping members 1736 and/or 1738 may include a non-slip pad 1902 on the exterior surface of the gripping members 1736 and/or 1738 for use when the holder 1700 is stood up on end and/or rested on a surface.

In an illustrative embodiment, the holder 1700 further includes a twist locking mechanism and an articulation joint. The holder 1700 including the twist locking mechanism and the articulation joint is described with reference to FIG. 20. As illustrated, a twist locking mechanism 2000 is positioned near the back of the support pad 1734. In this illustrative embodiment, the twist locking mechanism 2000 includes a handle 2002 configured to lock the first and second cross supports 1718 and 1724 in place when the holder 1700 is collapsed around the device. The holder 1700 and twist locking mechanism 2000 allow for the free movement of the holder 1700 so that the size can be changed to accommodate the correct height and width of a device and then easily locked in that position with a simple twist.

The holder 1700 may also include an articulation joint 2004. In this illustrative embodiment, the articulation joint 2004 is a ball joint 2006 and is attached to the back of the holder 1700, for example via a screw-on type connection with a twist grip connection 2008. Additionally, there may be a washer 2010 placed between the twist grip connection 2008 and the back of the holder 1700. The articulation joint 2004 may further include a locking mechanism having a twistable handle 2012 for securing the ball joint 2006 in place at a desired orientation.

While the articulation joint 2004 has been illustrated and described in connection with certain embodiments, it should be appreciated that other types of articulation joints may be used, including but not limited to hinges, swivel connections, rotating connections, and other joints of the type configured to allow the holder 1700 to be oriented in multiple positions.

In an illustrative embodiment, the holder further includes a universal quick snap connection 2014 for allowing various mounting bases to be quickly attached to or removed from the holder 1700. In this illustrative embodiment, the universal quick snap connection 2014 is attached to a slot 2016 in the back of the articulation joint 2004, for example via a screw-on type connection or other type of permanent or removable connection.

In an illustrative embodiment, the universal quick snap connection has a male connection point for insertion into a corresponding female connection point of various base designs, for example similar to the base designs described above in relation to the holder mount 406 and the articulation joint 408, that allow for the positioning and support of the holder for various uses such as on a table top, for holding at waist height, for mounting in a vehicle, on a wall or other surface, or for standing height. In other illustrative embodiments, the universal quick snap connection has a female connection point for receiving a corresponding male connection point of the various base designs.

Figure 21:
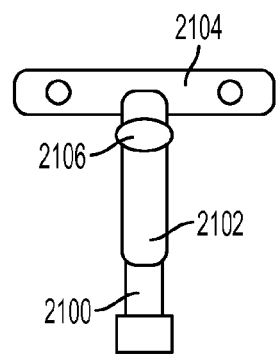
FIG. 21 illustrates an embodiment of a mounting base having a male and female connector.

Referring to FIG. 21, the holder 1700 may be attached to a universal slide in male connector 2100. The male connector 2100 is configured to mate with a corresponding female connector 2102 of a base design. Typically, the male and female connectors removably lock into one another for example via a screw-in, a snap-in, a push button type locking mechanism, and/or other locking mechanisms of the type. As illustrated, the base includes a mounting plate 2104 for mounting on a wall, floor, table, desk, ceiling, or other suitable surface. The base may further include an articulation joint 2106. The articulation joint 2106 allows for the up/down and left/right movement of the female connector 2102. This movement allows for any type of orientation of the attached holder 1700 and in particular allows for the holder 1700 to be pushed/pulled closer or further away from the user, or in other settings it allows for more left/right or up/down options.

Figure 22:
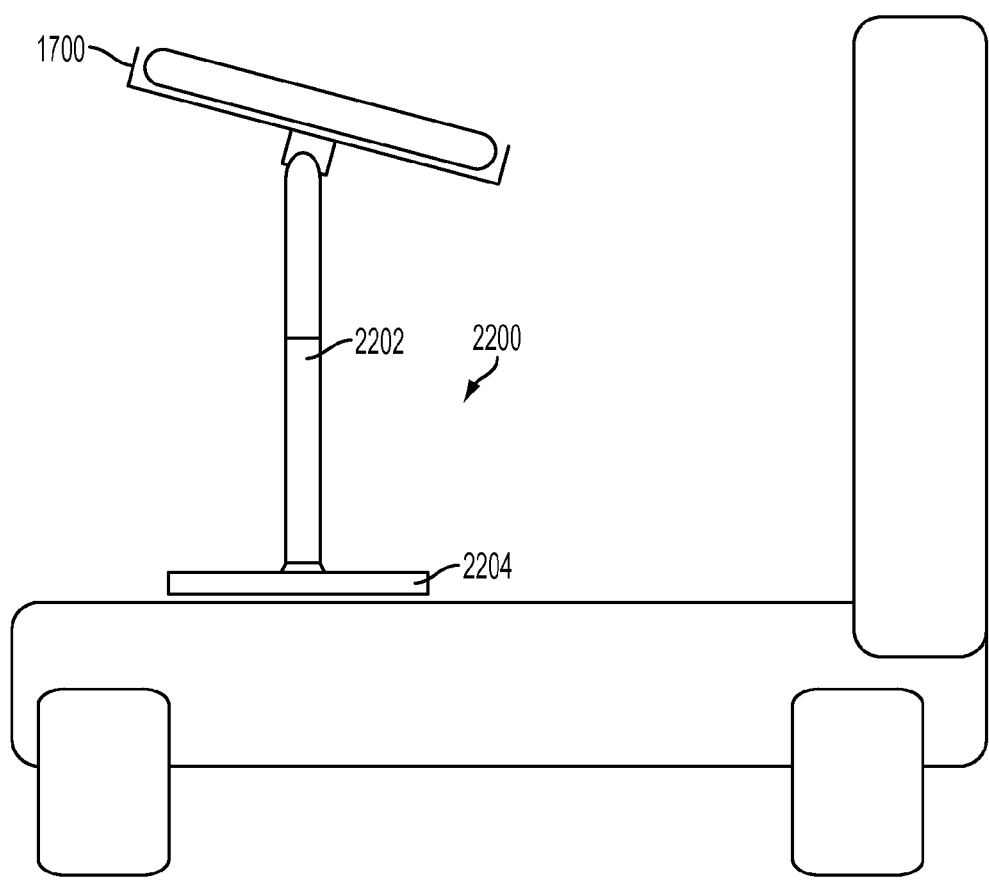
FIG. 22 illustrates an embodiment of a pedestal stand/base holding the collapsible holder.

Referring to FIG. 22, the holder 1700 may be connected to a pedestal type base 2200. The base 2200 may include an extension 2202 extending vertically upward from a base plate 2204. In an illustrative embodiment the holder 1700 may be attached to a universal male connector, as described above. The extension 2202 may include a corresponding female connector opposite the base plate 2204 for connection to the male connector on the holder 1700. Further, the extension 2202 may be adjustable in height, for example the extension 2202 may be telescoping to allow for the height of the extension 2202 to be adjusted by a user for optimal use.

Figure 23:
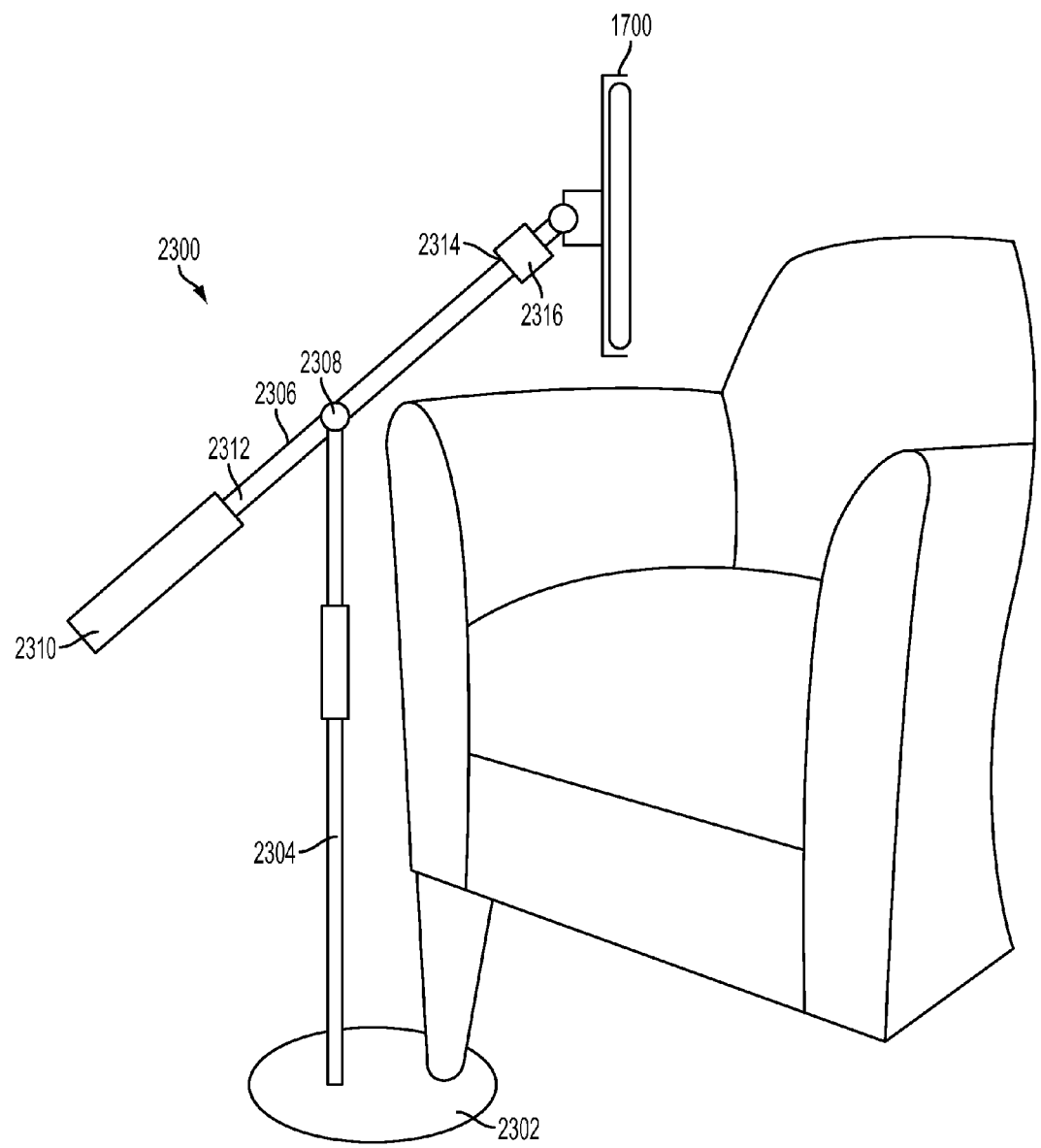
FIG. 23 illustrates an embodiment of an adjustable pedestal stand/base holding the collapsible holder.

Referring to FIG. 23, the holder 1700 may be connected to an adjustable pedestal type base 2300. The adjustable pedestal type base 2300 may include a base plate 2302, a vertical extension 2304 extending vertically upward from the base plate 2302, and an adjustable extension 2306 connected to the vertical extension 2304 opposite the base plate 2302. The base plate 2302 may have a size and shape configured to allow a leg of a chair or other piece of furniture to be placed on the base plate 2302 to hold the adjustable pedestal type base 2300 in place or for stability. The base plate 2302 may also have a sufficient size and weight to stabilize the adjustable pedestal type base 2300 alone.

The adjustable extension 2306 may be connected to the vertical extension 2304 by an articulation joint 2308 along the length of the adjustable extension 2306 allowing the adjustable extension 2306 to swivel up and down and/or rotate left and right. A counterweight 2310 may be attached to a first end 2312 of the adjustable extension 2306, and the holder 1700 may be attached to a second end 2314 of the adjustable extension 2306. The holder 1700 may be attached to the second end 2314 of the adjustable extension 2306 via a universal joint connection 2316, similar to the articulation joint and universal connection described above with reference to FIG. 20. The universal joint connection 2316 may include a universal male connector, as described above. The second end 2314 of the adjustable extension 2306 may include a corresponding female connector for connection to the male connector.

Further, the adjustable extension 2306 may be extendable, for example the adjustable extension 2306 may be telescoping, extendable and/or retractable allowing the length of the adjustable extension 2306 to be changed by the user to adjust the position of the holder 1700. The vertical extension 2304 may also be telescoping, extendable and/or retractable allowing the user to adjust the height of the holder 1700.

Figure 24:
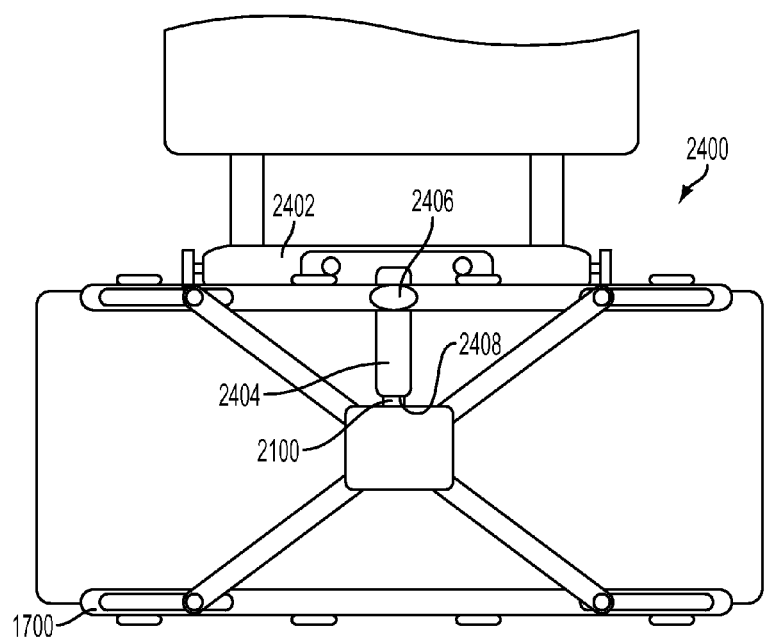
FIG. 24 illustrates an embodiment of a vehicle mounting base holding the collapsible holder.

Referring to FIG. 24, the holder 1700 may be connected to a vehicle mounting base 2400 configured to attach to a headrest of a vehicle seat in a similar manner as described above with reference to FIGS. 13 and 14. As illustrated the vehicle mounting base 2400 includes a mounting bracket 2402 and an extension 2404 located on a central portion of the mounting bracket 2402. The extension 2404 may include an articulation joint 2406 to enable a user to manipulate the orientation of the holder 1700 in one or more planes for optimal use. In this illustrative embodiment, the holder 1700 is connected to the universal slide in male connector 2100, as described above with reference to FIG. 21. The extension 2404 includes a corresponding female connector 2408 configured to mate with the male connector 2100 allowing the holder 1700 to be connected to and disconnected from the vehicle mounting base 2400.

Figure 25:
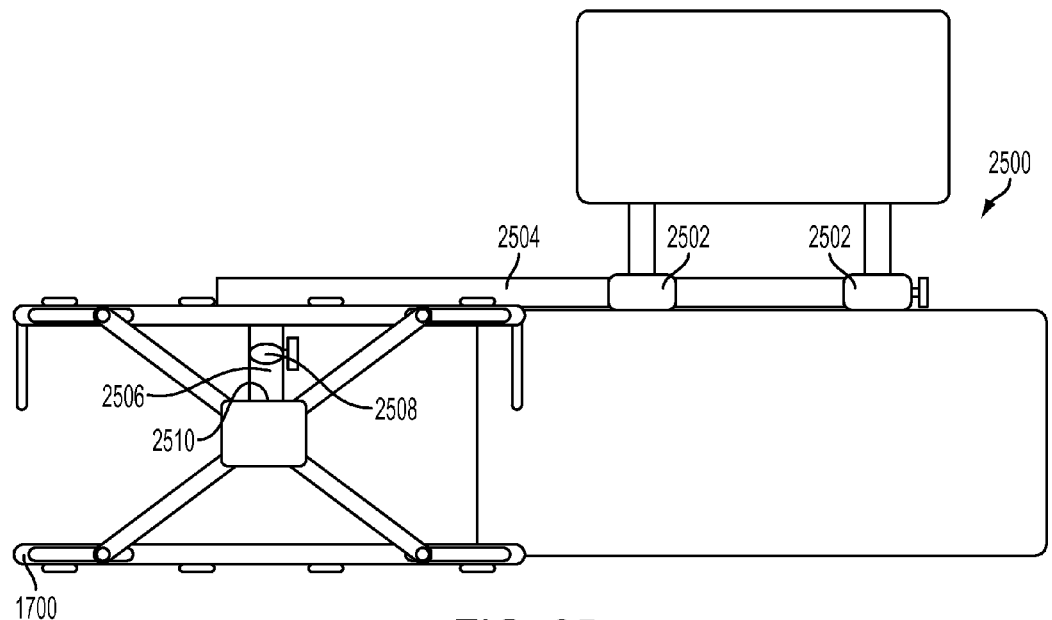
FIG. 25 illustrates another embodiment of a vehicle mounting base holding the collapsible holder.

In another embodiment, referring to FIG. 25, the holder 1700 may be connected to a vehicle mounting base 2500 configured to attach to a headrest of a vehicle seat in a similar manner as described above with reference to FIGS. 13-15. In this illustrative embodiment, the vehicle mounting base 2500 includes one or more mounting brackets 2502 and a first extension 2504 extending from one side of the mounting bracket 2502, and a second extension 2506 extending from the first extension 2504. The first extension 2504 and/or the second extension 2506 may include an articulation joint to enable a user to manipulate the orientation of the holder 1700 in one or more planes for optimal use. In this illustrative embodiment, the second extension 2506 includes an articulation joint 2508, and the holder 1700 is connected to the universal slide in male connector 2100, as described above with reference to FIG. 21. The second extension 2506 includes a corresponding female connector 2510 configured to mate with the male connector 2100 allowing the holder 1700 to be connected to and disconnected from the vehicle mounting base 2500.

While the vehicle mounting bases have been described in connection with embodiments designed to attach to a vehicle seat headrest having two posts, it should be appreciated that the vehicle mounting bases may be adapted to attach to a vehicle seat headrest having one post, or more than two.

While the different base designs are described above in relation to certain holders and holder mounts, any of the different base designs may be modified and/or implemented for use with any of the embodiments of the holders and/or holder mounts, and to include one or more articulation joints. The articulation joints may be configured to rotate around one or more axes, including a vertical axis and/or a horizontal axis, for example by tilting or swiveling forwards and backwards, allowing the user to manipulate the orientation of the holder in one or more planes for optimal use.

In an illustrative embodiment, any of the articulation joints disclosed herein may include locking mechanisms or articulation locks, configured to lock or hold the articulation joints in a desired orientation or at a desired angle. This may allow for the user to swivel and/or rotate the holder on one or more axes to a desired position and/or orientation and lock the articulation joints in the desired position and/or orientation.

While the different base designs are described above in connection with certain male and female connection points, it should be appreciated that the male and female connectors may permanently or removably lock into one another for example via a screw in, a snap in, a push button type locking mechanism, and/or other locking mechanisms of the type. Further, any of the different base designs may include one or more apertures or other fastening adoptions based on the different applications. For example, the base designs may include one or more apertures in the base plate, mounting plate, and/or mounting bracket for attachment to various surfaces, posts, and other structures. The base designs may be paired with other mounting materials such as adhesive glues or tapes when attaching to other devices, surfaces, or bases. The base designs may be made of various suitable materials, including but not limited to metals, polymers, composites, combinations thereof, and other materials of the type.

Additionally, any of the different base designs may have telescoping, extendable and/or retractable extensions allowing the user to manipulate the position of the holder. Any of the different base designs may also incorporate cable management options, for example as described above with reference to FIG. 16.

The device stands described above are designed to be able to adjust to the size of the device and hold the device securely. The holders and holder mounts may also be orientated for optimum use or viewing of the device. The adjustability of the holders and holder mounts offer a number of different angles allowing for the best experience for the user. The device stands described above allow the user to swivel the holder on one axis to a desired orientation, for example a landscape or portrait type orientation based on the device use and type. The user may also tilt the holder on another axis to support the bottom or under the device from below, for example for a laptop PC or DVD player type clamshell device, as well as from behind a device, for example a Tablet PC, game, DVD player, or other slate style device.

While the adjustable device stands have been described and illustrated in connection with illustrative embodiments, many variations and modifications will be evident to those skilled in the art and may be made without departing from the spirit and scope of the disclosure. For example, the holders described herein may be modified for use in other applications including but not limited to holding art/paintings, dishes, mirrors, signs, solar panels, Teleprompters, and other applications. The disclosure is thus not to be limited to the precise details of methodology or construction set forth above as such variations and modification are intended to be included within the scope of the disclosure.

What is claimed is:

1. A device holder comprising:
   a first support having first slots;
   a second support having second slots;
   a first cross support having a first pair of slideable rivets, one of said first pair of slideable rivets engaging one of said first slots and the other of said first pair of rivets engaging one of said second slots;
   a second cross support having a second pair of slideable rivets, one of said second pair of slideable rivets engaging one of said first slots and the other of said second pair of rivets engaging one of said second slots, said second cross support crossing said first cross support; and
   a plurality of gripping members positioned along the length of each of said first support and said second support said plurality of gripping members are rotatably coupled to each of said first support and said second support.

2. The device holder of claim 1, further comprising a support pad coupled to said first cross support and said second cross support where said second cross support crosses said first cross support.

3. The device holder of claim 1, further comprising an articulation joint coupled to a back of said holder.

4. The device holder of claim 1, further comprising a locking mechanism configured to lock said first support and said second support in a desired position.

5. The device holder of claim 1, further comprising a universal connection attached to a back of the holder.

* * * * *